United States Patent
Niitsuma

(10) Patent No.: US 7,535,592 B2
(45) Date of Patent: May 19, 2009

(54) IMAGE PROCESSING APPARATUS FOR SIMULTANEOUS PROCESSING OF A PLURALITY OF PRINT DATA

(75) Inventor: Tetsuya Niitsuma, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 962 days.

(21) Appl. No.: 10/915,677

(22) Filed: Aug. 9, 2004

(65) Prior Publication Data

US 2005/0117177 A1 Jun. 2, 2005

(30) Foreign Application Priority Data

Nov. 28, 2003 (JP) .............................. 2003-399765

(51) Int. Cl.
*G06K 15/00* (2006.01)
*G06K 9/36* (2006.01)
*H04N 1/04* (2006.01)
*G06F 13/00* (2006.01)

(52) U.S. Cl. .................. 358/1.16; 358/1.17; 358/505; 358/474; 358/523; 382/232; 711/168

(58) Field of Classification Search ............... 358/1.16, 358/1.17, 523; 382/232; 711/168
See application file for complete search history.

(56) References Cited

U.S. PATENT DOCUMENTS 6,449,064 B1 * 9/2002 Hattori et al. ............... 358/403

2002/0109860 A1 * 8/2002 Niitsuma .................. 358/1.15

FOREIGN PATENT DOCUMENTS

| JP | 11-234490 | 8/1999 |
| JP | 2000-354122 | 12/2000 |

OTHER PUBLICATIONS

An Office Action issued by JPO on Dec. 19, 2007, in connection with App. No. 2003-399765, 3 pgs.
Translation of the Office Action issued by JPO on Dec. 19, 2007, 7 pgs.

* cited by examiner

*Primary Examiner*—Edward L Coles
*Assistant Examiner*—Thomas J Lett
(74) *Attorney, Agent, or Firm*—Squire, Sanders & Dempsey L.L.P.

(57) ABSTRACT

This invention relates to an image processing apparatus capable of processing plural jobs at a high rate. The image processing apparatus is comprised of first and second buffer memory devices, which are independent of each other and configured to be simultaneously accessible; a compression-extension device, which is exclusively connected to each of the buffer memory devices; a control section to assign a buffer memory device to input image data raster by raster (one page of the image data) when executing input processing of the image data, which is input from a scanner or executes output processing of the image data to a printer section, so that the control section regulates and changes the image data flow raster by raster.

3 Claims, 5 Drawing Sheets

10···IMAGE PROCESSING APPARATUS

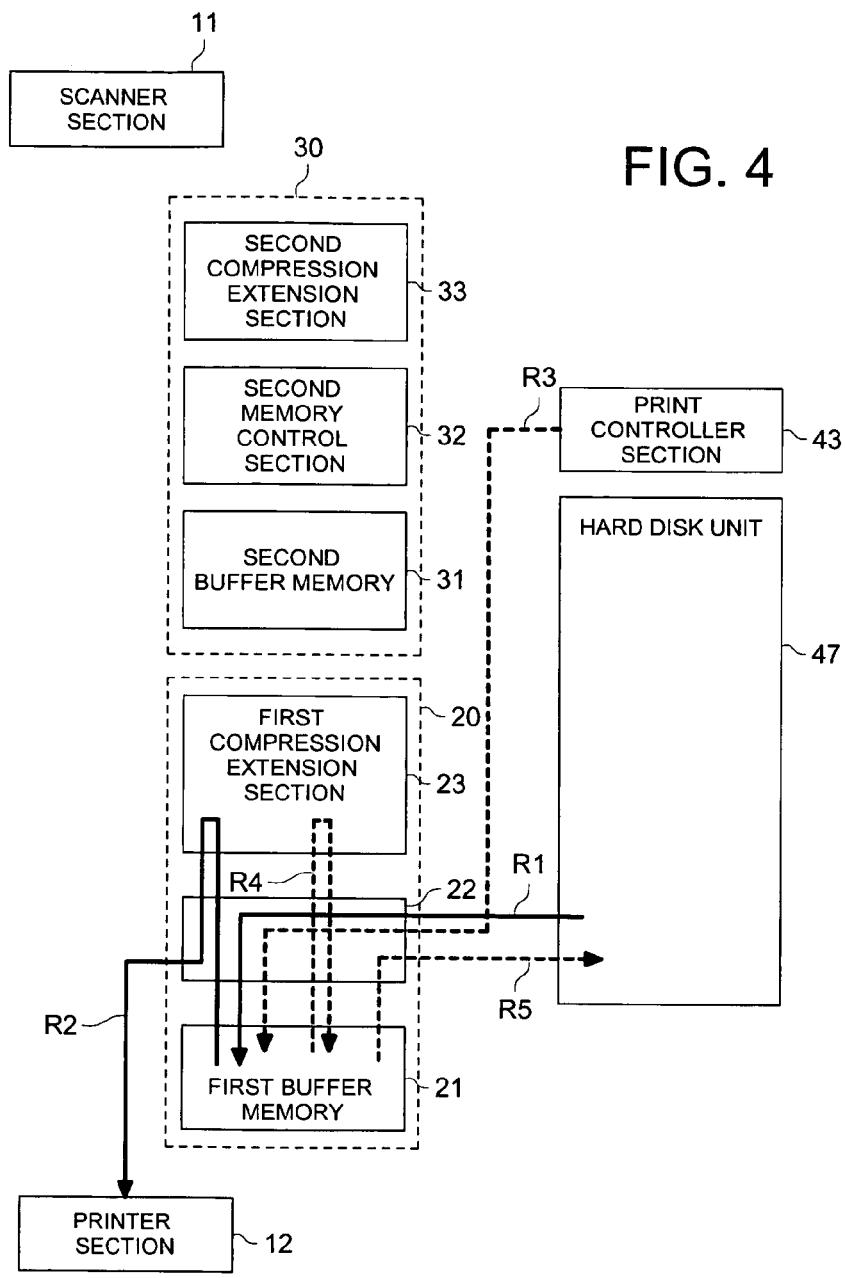

IMAGE PROCESSING APPARATUS FOR SIMULTANEOUS PROCESSING OF A PLURALITY OF PRINT DATA

BACKGROUND OF THE INVENTION

The present invention relates to an image processing apparatus used in a multi-functional apparatus, which can simultaneously carry out plural jobs, such as a scanning function to read manuscripts, a copying function to copy manuscripts and a printing function to make hard copies based on print data.

In order to reduce waiting time and to cater to the convenience of users, multiple jobs can be carried out simultaneously as long as the input/output devices are not used at the same time, in an image processing apparatus of a digital multifunctional apparatus featuring a scanning function, a copying function, a printing function and facsimile function. For example, while carrying out a printing operation of a manuscript requiring copying of plural paper sheets, carrying out a copy job, which will be used for the next printing cycle or while performing a scanning job, the sequential page printing job is carried out.

Generally, in order to carry out multiple-jobs simultaneously, image data from an input apparatus such as a scanner, etc. are arranged to be stored in an image memory device after being compressed, then the compressed data are read-out from the image memory device and output after extension is applied, when the essential output apparatus is available.

It is possible to carry out multiple input jobs or multiple output jobs simultaneously when plural input or plural output apparatuses are provided. However, it becomes impossible to carry out input jobs or output jobs simultaneously or efficiently due to the shortage of input or output devices when the number of the compression device or the extension (decompression) device falls short (for example, there is only one compression or extension device for each apparatus).

For example, it is possible to carry out a reading operation to scan a manuscript by a scanner and a receiving operation for print data simultaneously since the input devices used differ from each other. However, data processing speed is reduced when only one compression device is provided, since in order to carry out two-input processes simultaneously, the compression process for the scanning data and the compression process for a raster image, which has been converted from the printing data, on the same compression device, these processes have to be performed sequentially on the same compression device in a sequential page mode.

In order to overcome these problems, an image processing apparatus having plural compression devices to carry out compression process of image data read out by a scanner, and compression of a raster image converted from the print data, on two separate compression devices, has been proposed (for example, refer to a patent reference No. 1 listed below).

(Patent reference No. 1): Japanese Patent Application open for Public Inspection No. 2003-23543

In order to carry out an input process from a scanner etc., an output process to a printer etc., compression and extension processes of image data and a process to convert print data to a raster image, a buffer memory device is used to store the image data temporarily.

For example, print data is received simultaneously while copying, the following operations are carried out and access to the buffer memory device frequently occurs.
(1) An operation, which writes compressed image data captured by a scanner to the buffer memory device
(2) A reading operation of image data of (1) from the buffer memory device for image printing
(3) A writing operation of the image data, which has been converted to a raster image to the buffer memory device
(4) A reading operation of the image data of (3) for image compression
(5) A writing operation of the image data after a compression process has been applied
(6) A read out operation of the compressed data of (5) from the buffer memory device for storage on a hard disk apparatus. Then the accesses to the buffer memory are frequently conducted.

In a past it has been difficult to efficiently carry out plural jobs simultaneously even though plural compression devices are provided, since frequent access to the buffer memory device became a bottle neck.

SUMMARY OF THE INVENTION

The objective of the present invention is to provide an image processing apparatus capable of a high rate process of plural jobs in a simultaneous and efficient mode. In the following explanations the numbers in parentheses correspond to the numbers on elements or apparatus appearing in FIG. 1.

The problems stated above are solved by one of the following embodiments shown in (Item 1)-(Item 10) below.

(Item 1) An image processing apparatus being capable of simultaneously executing plural requested jobs for processing image data, comprising:

one or more than two input devices (11, 43, and 47, etc.) to input image data;

one or more than two output devices (12, 45, and 47, etc.) to output image data;

plural buffer memory devices (21 and 31) to temporarily store image data being input from input devices (11, 43, and 47, etc.) or image data being output to the output devices, plural buffer memory devices (21 and 31) are independent of each other and capable of being simultaneously accessible;

control device (14) to control image data flow related to executions of the requested jobs, wherein, when executing a job including each process, an input process to input image data from input device (11,43 and 47 etc.) and an output process to output-image data to output device (12, 45 and 47 etc.), control device (14) assigns a buffer memory device to control an image data flow related to the requested job, among plural buffer memory devices (21 and 31), to the each process for executing the each process.

According to the above embodiment, when executing an input process of an image data or an output process of an image data, it is possible to assign a buffer memory device used for each process from the plural buffer memory devices (21 and 31) since plural buffer memory devices (21 and 31) being independent of each other and simultaneously accessible are provided. It becomes possible to simultaneously and efficiently execute plural jobs by appropriately assigning a buffer memory device from plural buffer memory devices to each process being executed, since input and output operations associated with the buffer memory devices are dispersed.

Input devices (11, 43 and 47, etc.) may be one to input the image data into the buffer memory devices. For example, they may be a scanner apparatus, a communication apparatus such as network apparatus or hard disk unit, etc. Output devices (12, 45 and 47, etc.) may be one, to which image data read out from buffer memory devices are sent. For example, they may be a printer (12), a communication apparatus, a display apparatus and a memory apparatus.

As for the number of buffer memory devices, at least two are recommended. In order to make buffer memory devices independent of each other and simultaneously accessible, it is recommended, for example, that an exclusive memory controller is provided for each buffer memory device. Also, regarding buffer memory devices, semiconductor memories capable of high rate access are recommended. When one job includes both an input process and an output process, a buffer memory device may be assigned as each process is executed.

Further, it is permissible to assign more than two processes simultaneously in a buffer memory device. In such a case, a buffer memory device can process plural processes, which relate to the same job or different job. The important point is that a buffer memory device is assigned so that a process efficiency of the image processing apparatus is enhanced and access to the buffer memory is dispersed. For example, when it is possible to process an input process and an output process in the same buffer memory device, it can enhance the process efficiency since data transference between buffer memory devices can be omitted.

(Item 2) Image processing apparatus capable of simultaneously executing plural requested jobs for processing image data whose data size is more than one raster of image, the image processing apparatus comprising:

one or more input devices (11, 43 and 47, etc.) to input image data;

one or more output devices (12, 45 and 47, etc.) to output image data;

plural buffer memory devices (21 and 31) to temporarily store image data being input from input devices (11, 43 and 47, etc.) or image data being output to output devices (12, 45 and 47, etc.), the plural buffer memory devices (21 and 31) are independent of each other and capable of being simultaneously accessible;

control device (14) to control image data flow raster by raster, the image data flow is related to executions of the requested job, wherein, when executing a job including each process, an input process to input image data from input device (11,43 and 47 etc.) and an output process to output image data to output device (12, 45 and 47 etc.), control device (14) assigns a buffer memory device to control an image data flow related to the requested job raster by raster (single frame of images), among plural buffer memory devices (21 and 31), to each raster for executing the each process.

According to the embodiment, when executing an input process of image data and an output process of an output data, a buffer memory device can be assigned raster by raster of image data so that data flow of image data can controlled to be changed raster by raster. Namely, it is possible to maintain high process efficiency even though an execution status changes since a buffer memory device can be changed even while a job is being processed. One raster means one frame of image or one page of image data.

(Item 3) Image processing apparatus being capable of simultaneously executing plural requested jobs for processing image data whose data size is more than one raster of the image, the image processing apparatus comprising:

plural input devices (11, 43 and 47, etc.) to input image data; one or more output devices (12, 45 and 47, etc.) to output image data;

plural buffer memory devices to temporarily store image data being input from input devices (11, 43 and 47, etc.) or image data being output to the output devices (12, 45 and 47, etc.), plural buffer memory devices (21 and 31) are independent of each other and capable of being simultaneously accessible; and control device (14) to control image data flow; wherein, control device (14) assigns a buffer memory device raster by raster, while executing an output process to output image data to an output device (12) having a priority, when executing an input process to input image data from the input device (11, 43 and 47, etc.), the input process relates to a job, to which the output process relates, so that a buffer memory device used for the output process is assigned for the input process, and while executing an output process to output image data to an output device having (12) priority, when executing an input process, which relates to the different job, to which the output process relates, so that a buffer memory device not used for the output process is assigned for the input process.

According to the (Item 3) control device controls a buffer memory device raster by raster, while executing an output process to output image data to output device (12) having priority, when executing an input process, which relates to the same job, to which the output process relates, so that a buffer memory device used for the output process is assigned for the input process. And while executing an output process to output image data to output device (12) having a priority, when executing an input process, which relates to the different job, to which the output process relates, so that a buffer memory device not used for the output process is assigned for the input process.

Namely, when inputting image data while simultaneously outputting image data to output device (12) having a priority, where both image data relate to the same job, the image data is input in the same buffer memory device used for the job. The image data, which have been input, can be output immediately. And image data transference between buffer memory devices is not necessary. Consequently, process efficiency can be enhanced. And when inputting image data while outputting image data to output device (12) having priority, and both image data relate to different jobs, the image data is input in a different buffer memory device from which image data is output. Then, accesses to the buffer memory are dispersed so that input and output processing can be-executed smoothly.

Output device (12) means output devices (12, 45 and 47, etc.).

(Item 4) The output device (12) having a priority in (Item 3) above is a printer.

As for an output to printer (12), it is preferred to assign priority, and to finish the output process sooner than other jobs since there is a high possibility that users are waiting for the output.

(Item 5) The image processing apparatus in (Item 3) and (Item 4), wherein the buffer memory device used for an output process is constantly connected to the output device having priority.

According to the embodiment above, the hardware configurations can be simple since output device (12) having priory can be constantly connected to any one of the buffer memory devices.

(Item 6) The image processing apparatus in any one of from (Item 1)-(Item 5), further comprises image memory device (47) to store image data read from the buffer memory device.

Based on the invention above, it becomes possible to process a large size of image data, which cannot be stored in the buffer memory. Data save from a buffer memory device to image memory device (47) can be appropriately executed according to the condition when the execution is conducted. For example, image data in the buffer memory devices can be saved to image memory device (47) when buffer memory device overflow is approaching or image data stored in buffer memory device is not processed soon.

(Item 7) The image processing apparatus of (Item 6), wherein image memory device (47) is a hard disk unit.

According to (item 7), it can be possible to store a large size of image data under lower cost.

(Item 8) The image processing apparatus in any one of from (Item 1)-(Item 7) above wherein image data compression devices (23 and 33) and image data extension devices (23 and 33) each has an exclusive buffer memory device.

According to the above invention, process slow down and waiting for a process can be suppressed and high rate process to simultaneously process plural jobs can be possible. It is also possible to integrate compression device (23 and 33) and extension device (23 and 33) into one IC (Integrated Circuit) chip.

(Item 9) The image processing apparatus in any one of (Item 1)-(Item 8), wherein two buffer memory devices are provided.

According to (Item 9) above, access to buffer memory devices is dispersed and high rate processing can be achieved with minimum configuration.

(Item 10) An image processing apparatus being capable of simultaneously executing plural jobs requested for processing image data whose data size is more than one raster of the image, the image processing apparatus comprising:

one or more input devices (11, 43 and 47, etc.) to input image data;

plural output devices to output image data;

plural buffer memory devices (21 and 31) to temporarily store image data being input from input devices (11, 43 and 47, etc.) or image data being output to output devices (12, 43 and 47, etc.), plural buffer memory devices (21 and 31) are independent of each other and capable of being simultaneously accessible;

control device (14) to control image data flow; and predetermined buffer memory devices (21) among the plural buffer memory devices, the predetermined buffer memory device (21) is permanently connected to output devices (12) having priority; wherein, control device (14) controls image data flow so that the control device assigns a buffer memory device (31), which is other than the buffer memory devices being permanently connected (21) to output devices having a priority (12), to an input process of a job, which does not output image data to the output devices having the priority (12).

According to (Item 10) above, buffer memory device (31), being one other than the buffer memory device (21), which is dedicated to output device (14) having priority, is assigned to process a job for image data, which does not output any image data to output device (14) having priority.

Consequently, a printing job not outputting image data to output device (12) having priority and using a buffer memory device other than buffer memory device (21) dedicated to the output device (12), does not disturb the use of predetermined buffer memory device (21) by a job using the output device having priority so that it is possible to efficiently process the job using the output device having priority.

According to the image processing apparatus based on the embodiments above, it becomes possible to distribute the access to the buffer memory devices by assigning a buffer memory device to each process and thereby more efficiently execute plural jobs by providing plural buffer-memory devices, independent of each other and simultaneously accessible.

It is possible to change the buffer memory device, which is used for a job, in the middle of that job by assigning buffer memory raster by raster of the image data and controlling the image data flow raster by raster of the image. Consequently, even though execution conditions are changed by job completion and/or new job input, it is possible to maintain the high process efficiency in spite of changing conditions.

When executing the input process of a job, while also executing the output process to output image data of the same job to the output device having priority, by using a buffer memory device used by the output process, for the input process, it becomes possible to improve process efficiency since no image data transfer between buffer memory devices is necessary.

When executing the input process of a job, while executing the output process to output image data of a different job to an output device having priority, by using a buffer memory device not used by the output process, for the input process, it becomes possible to execute high rate processes for input and output processes since accesses to buffer memory device are dispersed.

In the case that a buffer memory device is dedicated to an output device having priority, a hardware configuration can be simplified since the output device is connected to the buffer memory device and no other additional circuitry is necessary.

Further, by providing an image data memory device for storing image data read from a buffer memory device, a job including a large size of image data could be processed by saving the image data stored in buffer memory device to the image data memory device.

It is possible to store a large size of image data by using a hard disk unit for the image data memory device.

Thereby it becomes possible to simultaneously process plural jobs at a high rate by providing a compression device and a extension device on each buffer memory device to avoid waiting for processing due to the lack of compression and extension resources.

It is possible to achieve a high rate process by providing two buffer memory devices, which are the minimal configuration, to disperse access to the buffer memory device.

A job not outputting image data to an output device having priority and using a buffer memory device other than the buffer memory device dedicated to the output device, does not interfere with the use of predetermined buffer memory device by a job, which uses the output device having priority so that it is possible to efficiently process the job using the output device having priority.

BRIEF DESCRIPTION OF THE DRAWINGS

FIG. 4 shows an example of image data flow when processing an input job while outputting image data of the same job.

FIG. 5 is an example of a priority order.

DESCRIPTION OF THE INVENTION

An embodiment of the present invention will now be explained.

Figure 1:
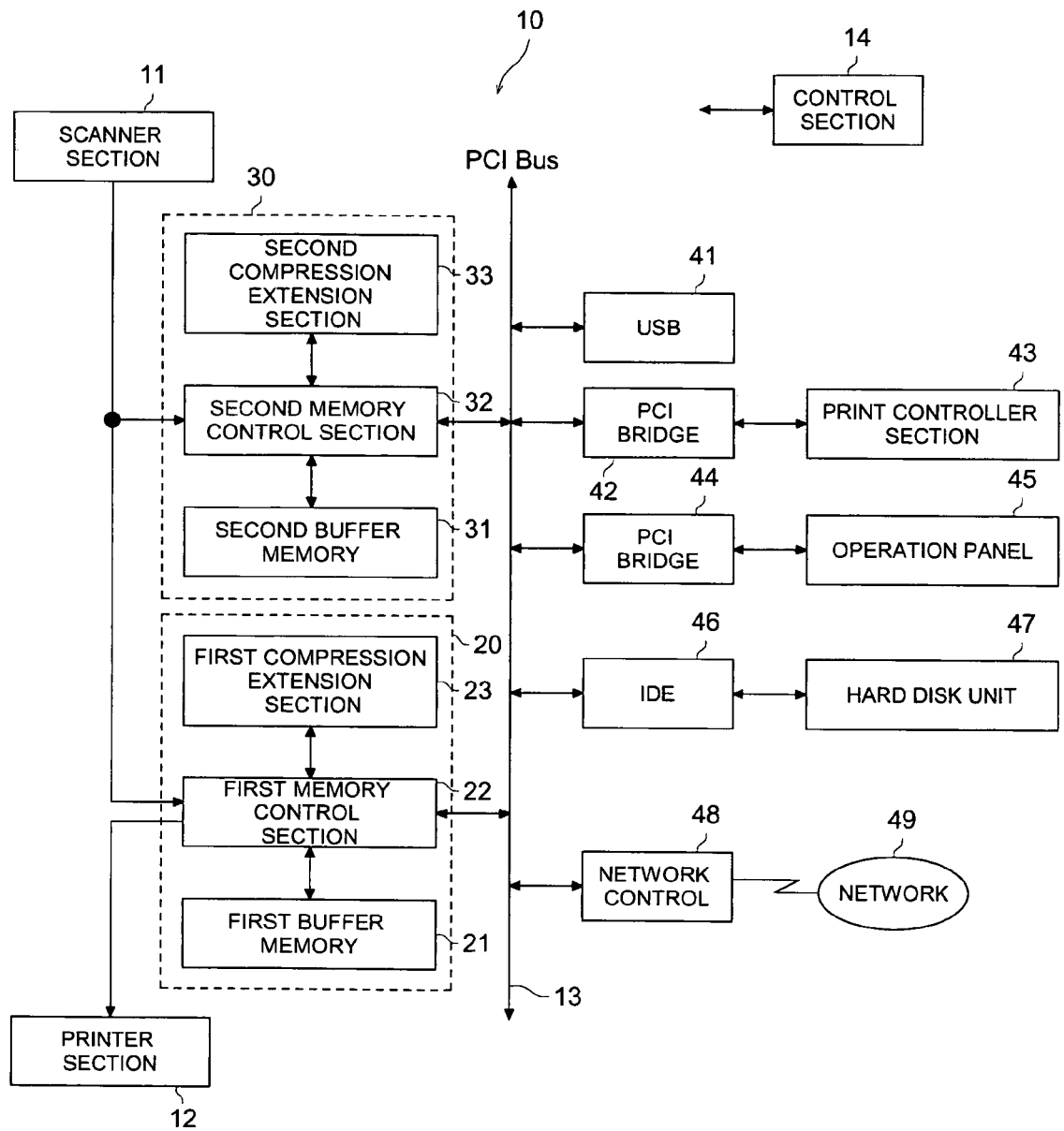
FIG. 1 is a block diagram showing the configuration of an embodiment of the present invention.

FIG. 1 is a schematic block diagram of image processing apparatus 10 of an embodiment of the present invention. Image processing apparatus 10 is a digital multi-functional apparatus having a scanning function to read manuscript images, a copying function to copy the read images onto recording paper sheets, a printing function to print images onto recording paper sheets corresponding to print data received from peripheral equipment, an image data transferring function to send and receive image data between peripheral equipment through a network.

Image processing apparatus 10 comprises scanner section 11, printer section 12 and several devices connected to PCI (Peripheral Components Interconnection) Bus 13. Scanner section 11 is an input device to capture manuscript images and comprises a light source to radiate the manuscript images, a line image sensor to capture one individual lines of the manuscript images in the lateral direction, a moving device to move the read-out unit in the longitudinal direction of the manuscript, and an optical path comprising lenses and mirrors to guide the reflected light from the manuscript to the line image sensor to form images. The line image sensor comprises a CCD (Charge Coupled Device). Analog signals from the line image sensor are converted to digital signals (A/D conversion) and input as digital image data.

Printer section 12 forms images onto recording paper sheets based on images corresponding to the image data by an electronic photographic process. Printer section 12, which is configured as a laser printer, comprises a paper sheet transfer apparatus, a photosensitive drum, an electrification apparatus, a laser unit, a developing apparatus, a transfer separation apparatus, a cleaning apparatus and a fixing apparatus.

First image processing section 20 and second image processing section 30 are hooked up to PCI bus 13. First image processing section 20 comprises first buffer memory device 21, first memory device control section 22 and first compression/extension section 23. First buffer memory device 21 is a RAM (Random Access Memory) comprising semiconductor memory whose memory capacity can store up to approximately one hundred rasters (frames) of images. First memory device control section 22 is a control circuit to control input/output image data to/from first buffer memory device 21. First compression extension section 23 functions to compress and decompress image data passing through first memory device control section 22. First buffer memory device 21 and first compression extension section 23 are hooked up to first memory device control section 22 while first memory device control section 22 is connected to PCI bus 13.

Second image processing section 30, which has the same configuration of first image processing section 20, comprises second buffer memory device 31, second memory device control section 32 and second compression extension section 33. Scanner section 11 is connected to first memory device control section 22 of first image processing section 20 and also second memory device control section 32 of second image processing section 30 so that the image data can be output to first image processing section 20 as well as second image processing section 30. Printer section 12 is connected to first memory device control section 22 of first image processing 20 so that the image data can only be output through first image processing section 20.

Other than the above, USB (Universal Serial Bus) interface section 41, PCI bridges 42 and 44, IDE (Integrated Drive Electronics) interface section 46 and network control section 48, which are connected to PCI 13. USB interface section 41 is an input/output circuit to be hooked up by various USB based apparatuses. PCI bridges 42 and 44 are interface circuits to connect the PCI bus to other types of buses. Print controller section 43, which converts print data to raster images based on analysis, is connected to PCI bridge 42. Print controller section 43 can handle not only text data but also various page description languages.

Various operation panels 45 are connected to PCI bridge 44. Operation panel 45 comprises an LCD (a Liquid Crystal Display) with a touch panel on the surface of the LCD and various operational switches to display various instructions for operators and accomplishes various operations from operators. Thumbnail images, which are simplified and small sized manuscript images, are also displayed on operational panel 45.

Hard disk drive unit 47 is connected to IDE interface section 46. IDE interface section 46 is an interface circuit to connect hard disk unit 47 to PCI bus 13, etc. Compressed image data is stored in hard disk unit 47. Network control section 48 functions to communicate various peripheral equipment via network 49.

Image processing apparatus 10 includes control section 14, which controls operation of image processing apparatus 10. Control section 14 comprises CPU (Central Processing Unit), ROM (Read Only Memory) and RAM (Random Access Memory) as a main section circuit. Control section 14 is connected to a CPU bus, which is different from the PCI bus 13 which passes on the image data, while various apparatuses are connected to scanner section 11, printer section 12 and PCI bus 13 and arranged to send and receive control signals through input/output bus, which is not shown. Control section 14 functions to control job execution and data flow when jobs are executed via a job control device.

Image processing apparatus 10 is designed to execute plural jobs simultaneously as long as the input/output devices are not used simultaneously. As an input device to input image data, other than scanner section 11, there are print control section 43, hard disk unit 47 and network control section 48. Print control section 43 services as an input device for image data by supplying image data, which are raster images converted from print data. Network control section 48 services as an input device of image data by receiving image files from external apparatuses through network 49. Hard disk unit 47 services as an input device of image data by reading and sending out stored image data. Other than the above, in cases that a facsimile receiving function is provided, a portion thereof, which performs the same function as described above is deemed an input device.

In regard to output devices of image data, other than printer section 12, there are printer control section 43, network control section 48, hard disk unit 47 and operation panel 45. Printer controller section 43 functions to output image data. Network control section 48 serves as an output device by sending electronic mail having attached files including image data to peripheral apparatus through network 49. Hard disk unit 47 services as an output target storage device of first buffer memory device 21 and second buffer memory device 31. Operation panel 45 services as an output device by displaying thumbnail images. Other than the above, in the case when a facsimile sending function is provided, a portion thereof, to which performs the same function as described above, is deemed as an input device.

Next, copying operations will be explained. Image data obtained by reading a manuscript by scanner 11 is compressed by compression extension section 23 after passing through first memory device control section 22 in first image processing section 20, and stored in first buffer memory device 21. After that, the image data is decompressed by compression extension section 22 after passing through memory device control section 22 in first image processing section 20 and visualized into images by printer section 12.

In the case that there are a large number of raster images (number of paper sheets of the manuscript), and all compressed data cannot be stored in first buffer memory device 21, then the compressed image data are arranged to be saved to hard disk unit 47 through PCI bus 13 and IDE interface section 46. Prior to printing, the saved image data is read from hard disk unit 47 and returned to first buffer memory device 21 through PCI bus 13. Then the saved image data from first buffer memory device 21 is decompressed by compression extension section 23 after passing through first memory device control section 22 and sent to printer section 12.

Image processing apparatus 10 includes first image processing section 20 and second image processing section 30, which are designed to simultaneously and speedily execute plural jobs by utilizing second image processing section 30. As an example of simultaneous execution of plural jobs, a case in which while a copying job is under execution, print data receiving operation while a printing job is simultaneously executed will now be explained hereinafter.

Figure 2:
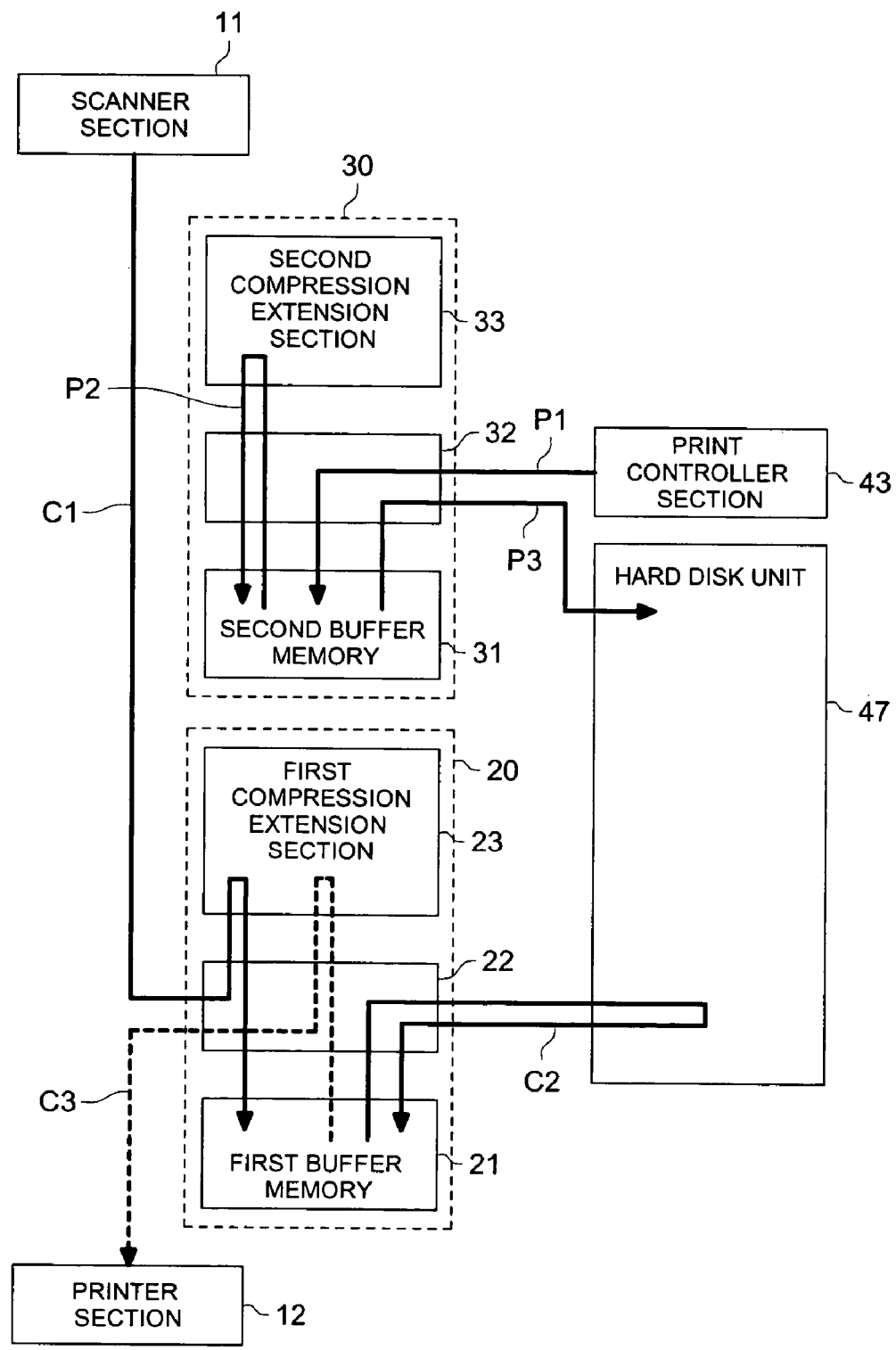
FIG. 2 explains data flows of image data in an embodiment of the present invention when receiving printer data while executing a copying job.

FIG. 2 shows data flow of the operations described above. The data flow related to copy operations comprises paths C1 and C3 as described above. Path C1 shows that image data from scanner section 11 is compressed by first compression extension section 23 after passing through memory device control section 22 in first image processing section 20, and then subsequently stored in first buffer memory device 22. Path C3 shows that the compressed image data is decompressed by first compression extension section 23 after passing through memory device control section 22 in first image processing section 20 is and is then sent to printer section 12. When the image data is saved to hard disk unit 47, path C2 is added between C1 and C3 as shown in FIG. 2.

Figure 3:
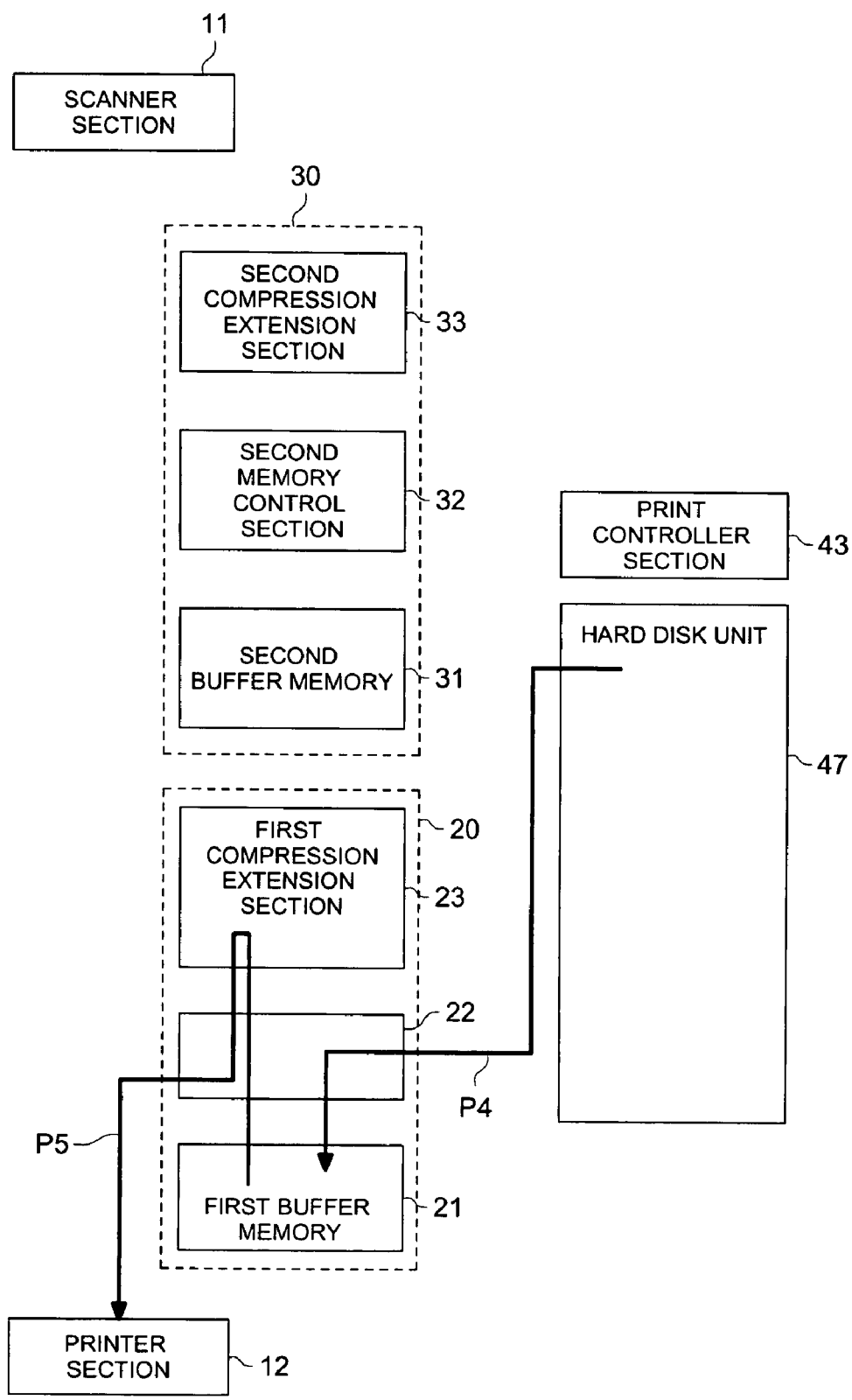
FIG. 3 is an example of image data flow when printing image data read out from a hard disk unit after status shifts from the status shown in FIG. 2, following completion of the receiving operation and of the copying job.

When receiving print data, image data rasterized by print controller section 43 are stored in second buffer memory device 21 after passing through PCI bus 13 and second memory device control section 32 in second image processing section 30 (Path P1). After that the image data are compressed by second compression extension section 33 and returned to second buffer memory device 31 (Path P2), and then further transferred to hard disk unit 47 (Path P3). Consequently, the image data stored in hard disk unit 47 is, as shown in FIG. 3, read and transferred into first buffer memory device 21 from hard disk unit 47 after passing through first memory device control 22 in first image processing section 20 (Path P4), and then further sent to printer section 12 after being decompressed by first compression extension section 23 (Path P5).

As described earlier, it has become possible to simultaneously and speedily execute two jobs since the compression extension section and the buffer memory devices are not used at the same, time by providing first image processing section 20 used for copying operations and independent of second image processing section 30 used for receiving print data. Specifically, lowering of through-put of the image processing due to access competition to the buffer memory device can be decreased since not only a compression extension section but also a buffer memory device are provided independently.

When receiving operations of print data, when a copying job and a printing job are executed simultaneously, the following access operations are executed.

(1) A writing operation of image data, which are compressed after being captured by a scanner, before being sent to a buffer memory device. (Refer to path C1 in FIG. 2)
(2) A reading operation of the image data of (1) from the buffer memory device. (Refer to path C3 in FIG. 2)
(3) A storing operation of image data being rasterized to a buffer memory device. (Refer to path P1 in FIG. 2)
(4) A reading operation of the image data of (3) from the buffer memory device for compression. Refer to path P2 in FIG. 2)
(5) A storing operation of the compressed image data to the buffer memory device. (Refer to writing operation path P2)
(6) A reading operation of the compressed image data of (5) from the buffer memory device to a hard disk unit. (Refer to path P3 in FIG. 2)

As described above, many access operations are requested to the buffer memory device. Consequently, lowering of throughput, data transferring delay and lowering of performance are caused due to the multiple access requests. In order to minimize the situation described above, operations defined by (1) and (2) above are executed by first image processing section 20 while operations defined by (3)-(6) are executed by second image processing section 30 so that it becomes possible to realize high rate image processing by decreasing a lowering of throughput due to the access competition to the buffer memory device.

Control section 14 controls data flow of image data and assigns the buffer memory device. These operations are described in the following two items.

[1] For the image data processing of input data, which relates to a job which is currently executed under output processing via printer section 12, (it will be called a current printer job hereinafter), first image processing section 20 is used. This is because no data transmitting is necessary when using the same buffer memory device for both output and input processes, and it is advantageous performance and control of the apparatus in case hard disk unit 47 is not necessary to due to limited amount of data. This for example, corresponds to the case that a copy operation follows paths C1 and C3 without detouring through C2.

[2] In the case of a job, which is not the current printer job, (it will be called a reservation job), second image processing section 30 is used. In this case, as already explained earlier, access to buffer memory device is dispersed and advantageous performance is realized.

Next, control of image data flow, when the current printer job is changed to another job will be explained. An example of a status shift from the status of two operations, in which a copying job and a printing job including print data receiving continue simultaneously, to the next status that the current print job, which uses printer section 12 to process the output processing of the printing job starts after the copying job ceases and after that the receiving operation of print data continues, will now be explained. As shown in FIG. 2, before the copying job ceases, the receiving operation of print data has been conducted by using second image processing section 30. When the output processing changes to the current printer job from the status above, the data flow of image data also changes based on the description in [1] above.

Namely, as the current printer job and receipt of the print data relate to a same job, the image data flow is changed to be executed by first image processing section 20 as shown in FIG. 4. In detail, the image data, which have been stored in hard disk unit 47 are read and transmitted to first buffer memory device 21 (path R1) through first memory device control section 22 in first image processing section 20, and further output to printer section 12 (path R2) after being decompressed by first compression extension section 23. At the same time, image data rasterized by print controller section 43 are stored in first buffer memory device 21 (path R3) through first memory device control 22 in first image processing section 20, then returned to first buffer memory device 21 (path R4) after being compressed by first compression extension section 22, further transferred to hard disk unit 47.

Switching of the controls is done raster by raster (page by page). In detail, when a new raster image or new image processing starts, the new raster image is checked to see if it relates to the same job as the current print job. If it relates to the same job, then the image data flow is changed so that the input process of the raster image is executed by first buffer memory device 21 in first image processing section 20.

Next, control of image data flow, when plural reservation jobs are requested will be explained. First image processing section 20 is used by the current job and second image processing section 30 is reserved for a reservation jobs. In this case, these plural control methods exhibit pros and cons. The first method is that the reservation job requested later (the second reservation job) is held until previous reservation job becomes the current job. Which is the simplest and easiest method of image data flow control. However in case that the second reservation job is an input process of scanner section 11, an user has to wait until the input process starts to be executed and obviously it is not desirable.

In order to improve this situation, when the second reservation job requested to be executed later pertain to an input process by scanner section 11, it is better to raise the priority by interrupting a previous reservation job and allow a special image processing control to proceed with the second reservation job by allowing executing of the input process from scanner section 11.

The second control method is one in which the reservation job and the second job proceed simultaneously by using second buffer memory device 31 in second image processing section 30 alternately page by page. This can lower dissatisfaction of users since not all input processes by using scanner section 11 are executed. However it is difficult to totally satisfy the user since the input process by scanner section 11 and another input process are executed simultaneously and alternately page by page whereby processing speed of input operations by scanner section 11 is lowered.

There is however a control method as a compromise between the first method and the second method above. The compromise is that only when the second reservation job requested to be input later by an input process by scanner section 11, the second method is applied and the first method is applied to other than that.

There is the advantage that switching of the current printer job can be easily carried out since first buffer memory device 21 of first image processing section 20 is not used and remains open for the reservation job and the second reservation job.

The third method is to use first buffer memory device 21 of first image processing section 20 for the second reservation job scheduled for later execution. Maximum performance can then be expected, however in this case as the number of access to hard disk unit 47 is now three being two reservation jobs and the current print job, through-put of data input/output to/from hard disk unit 47 will be lowered and execution speed for each job may be lowered. Also when the current printer job switches, control becomes complex since following operations occur; operations to switch from the current printer job, which has used second image processing section 30, to first image processing 20, and operations to switch the scanner input job, which has used first image processing section 20 to second image processing section 30.

In order to avoid confusion when the current printer job is switched, it is allowed that when the second reservation job is requested, the reservation job uses first buffer memory device 21 of first image processing section 20 and the second reservation job uses second buffer memory device 31 of second image processing section 30. However in this case, there is a possibility that processing rate of the reservation job might be lowered since throughput related to access to the buffer memory device is limited due to the existence of the printer job, which is executed at high priority in first image processing section 20.

From the third reservation job onward, which is requested still later than the second reservation job, control of just delaying the job until previous jobs are finished is in general no problem.

Now, handling jobs, which do not use a printer (for example, scanning of e-mails) will be explained. These jobs, which do not use a printer, as the exception, use second image processing section 30 even though it is a current job. Accordingly, when printer input is requested as a subsequent job, it may be assigned to first image processing section 20 so that it can be treated as a current printer job so that the previous job and the following job can be processed efficiently.

In this embodiment, when plural reservation jobs are requested, the following control methods will be applied based on these pros and cons.

1 A reservation job arrived later is held as a principle.
2 However, under the condition that first image processing section 20 is not processing a current job, the second reservation job is processed by first image processing section 20. In this case, the lowest process priority is applied so that no performance degradation occurs on the current printer job processed by first image processing section 20 and the first reservation job processed by second image processing section 30. Further, when a job, which does not require a printer, is requested under high priority, the job is assigned to first image processing section 20 and a reservation job may be put on hold if necessary.
3 When the second reservation job shifted to the first reservation job by the switching from the current job, the next reservation job process should be put on hold until the current job processed under second image processing section 30 has completely shifted to first image processing section 20, and then next reservation job will be accepted.
4 In regard to printer jobs, it is necessary to allow a sufficient buffering including the next job so that idling time is reduced. At that time, judgment whether a current printer job reside, has to be made based on the job, for which the buffering has started.

So far, input processing from a scanner, input processing of print data and an output processing to a printer have been discussed, and now other functions will be explained. Image processing apparatus 10, which relates to the embodiment of the present invention, as explained above, comprises scanner section 11, print controller section 43, hard disk unit 47 and network control section 48 being as input devices of input image data. With regard to output devices to output image data, printer section 12, print controller section 43, network-control section 48, hard disk unit 47 and operation panel 45 are provided. Print controller section 43 functions to output image data to device other than the image processing apparatus 10, as an output device, other than the function to rasterize the print data.

Using these input and output devices described above can realize the following combinations of functions.

1. Thumbnail display while printing: While displaying a previous job, in order to make a reservation for the next job, a stored image is read from hard disk unit 47 and minimized and displayed on operation panel 45. The current job is read into the buffer memory device in first image processing section 20 and output to a printer. When there is a reservation job, the data is compressed by second compression extension section 33 in second image processing section 30 and stored in hard disk unit 47. However, as for the thumbnail display, it can be operated simultaneously. The following is an example showing the image data flow.

In regard to the current job, the image data flow is as follows. Scanner section 11->compression by first compression extension section 23->first buffer memory device 21->(hard disk unit 47->first buffer memory device 21->) extension by first compression-extension section 23->printer section 12.

In regard to the reservation job, the image data flow is as follows. Print controller section 43->second buffer memory device 31->compression by second buffer memory device 33->second buffer memory device 31->hard disk unit 47.

In regard to the thumbnail display, the image data flow is as follows. Hard disk unit 47->second buffer memory device 31->extension by second compression extension section 33->second buffer memory device 31->(minimized processing)->second buffer memory device 31->operation panel 45.

2. IP scanner while printing: refer to an execution of scanner function while a print job is executed. Following is an example of the image data flow.

With regard to the current job, image data flow is as follows: print controller section 43->first buffer memory device 21->compression by first compression-extension section 23->first buffer memory device 21->(hard disk unit 47->first buffer memory device 21->) extension by first compression-extension 23->printer section 12.

With regard to scanner job, the image data flow is as follows: scanner section 11->compression by second compression-extension section 33->second buffer memory device 31->extension by second compression-extension section 33->second buffer memory device 31->(print controller section 43).

3. The reservation job is scanned while printing through printer I/F; Following is an example of the image data flow.

In regard to the current job, the image data flow is as follows. Print controller section 43->first buffer memory device 21->compression by first compression-extension section 23->first buffer memory device 21->(hard disk unit 47->first buffer memory device 21->) extension by first buffer memory device 23->printer section 12.

With a reservation job, the image data flow is as follows: scanner section 11->second buffer memory device 31->compression by second compression-extension section 33->second buffer memory device 31->hard disk unit 47.

4. Job editing (or a tandem reservation) while printing under copying job: "job editing" refers a function to edit a job on a PC (Computer apparatus such as a personal computer), to which the job is transferred from memory device (buffer memory device or hard disk unit 47). "Tandem" means a function to process the same job simultaneously with plural devices, to which the job is transferred from a memory device (buffer memory device or hard disk unit 47).

In the current job, the image data flow is as follows: scanner section 11->compression by first compression-extension 23->first buffer memory device 21->(hard disk unit 47->first buffer memory device 21) extension by compression-extension section 23->printer section 12.

In a job editor job, the image data flow is as follows: hard disk unit 47->second buffer memory device 31->network control section 48 (->PC).

5. For thumbnail display while printing through printer I/F:
Following are examples of the image data flow.

In a current job, the image data flow is as following: print controller section 43->first buffer memory device 21->compression by compression-extension 23->first buffer memory device 21->(hard disk unit 47->first buffer memory device 21->) extension by first compression extension section->printer section 12.

For a reservation job, the image data flow is controlled as following. Scanner 11->compression by second compression-extension section 33->second buffer memory device 31->hard disk unit 47.

For a thumbnail display, the image data flow is controlled as following. Hard disk unit 47->second buffer memory device 31->extension by second compression-extension 33->second buffer memory device 31->(minimizing processing)->second buffer memory device 31->operation panel 45.

6. Following are example of the image data flow for IP scanner while printing printer images.

In a current job, the image data flow is as follows: print controller section 43->first buffer memory device 21->compression by first compression-extension 23->first buffer memory device 21->(hard disk unit 47->first buffer memory device 21->) extension by first compression-extension 23->printer section 12.

In the scanner job, the image data flow is as follows: scanner section 11->compression by second compression-extension section 33->second buffer memory device 31->(print controller section 43).

7. Regarding job editing job (or a tandem reservation) while printing under printer I/F, following are examples of the image data flow.

In a current job, the image data flow is as follows. Print controller section 43->first buffer memory device 21->compression by compression-extension section 23->first buffer memory device 21 (->hard disk unit 47->first buffer memory device 21->) extension by first compression-extension 23->printer section 12.

In job editing job, the image data flow is as follows. Hard disk unit 47->second buffer memory device 31->networks control section 48 (->PC).

In every combination of the functions explained above, following tasks or sequences explained above can appropriately control the image data flow. Following is the details of the controls.

Firstly, check priority of a job, which is newly input, compare the priority to the priority of the current job under execution and decide the order of the jobs accordingly. The order of job execution is as follows; current job/reservation job/second reservation job. In case of a job, which does not require use of a printer, the number of current job is will be two since that kind of job can be executed simultaneously. In this embodiment, in principle, a higher priority is given to a job, which requires a scanner. Further, the highest priority is given for a thumbnail display.

FIG. 5 is a chart for priority ordering of jobs. Priority chart 100 shows job classification with its priority, necessity of printer 12 and special limitations or remarks related to the job priority.

Decisions of job execution order are as follows.

8. When inputting a job assigned priority order No. 1, the execution order of the current job is lowered to a reservation job by one rank and replaced by the new job (since a highest priority job can not be input doubly, the priority order of current job becomes 2 or lower). When a reservation job already has been input, the priority order of that job becomes a second reservation job. Further, when a second reservation job has already been input, then that job is going to be delayed temporarily. If there is any competition for scanner 11 or such resources, the lower priority jobs (tasks) are blocked temporarily.

2. When inputting a job assigned priority order No. 2, the priority order of the job currently being executed is checked. If that priority order is No. 3, the current job is replaced by the new job as explained in item 1 above, and all priority orders are lowered by a value of one. In case that the priority order of the current job is higher than No. 2 (obviously being No. 1), check the priority order of jobs and in case the priority order is No. 3 the reservation job is replaced by the newly input job as explained in item 1. Above and the executing order is lowered by one.

3. When inputting a job assigned priority order No. 3, search for an open priority order then input the job with priority order with that number. It is not necessary to control the job when no open space is found in the priority order since no job is being input when no space is found in priority order.

Figure 6:
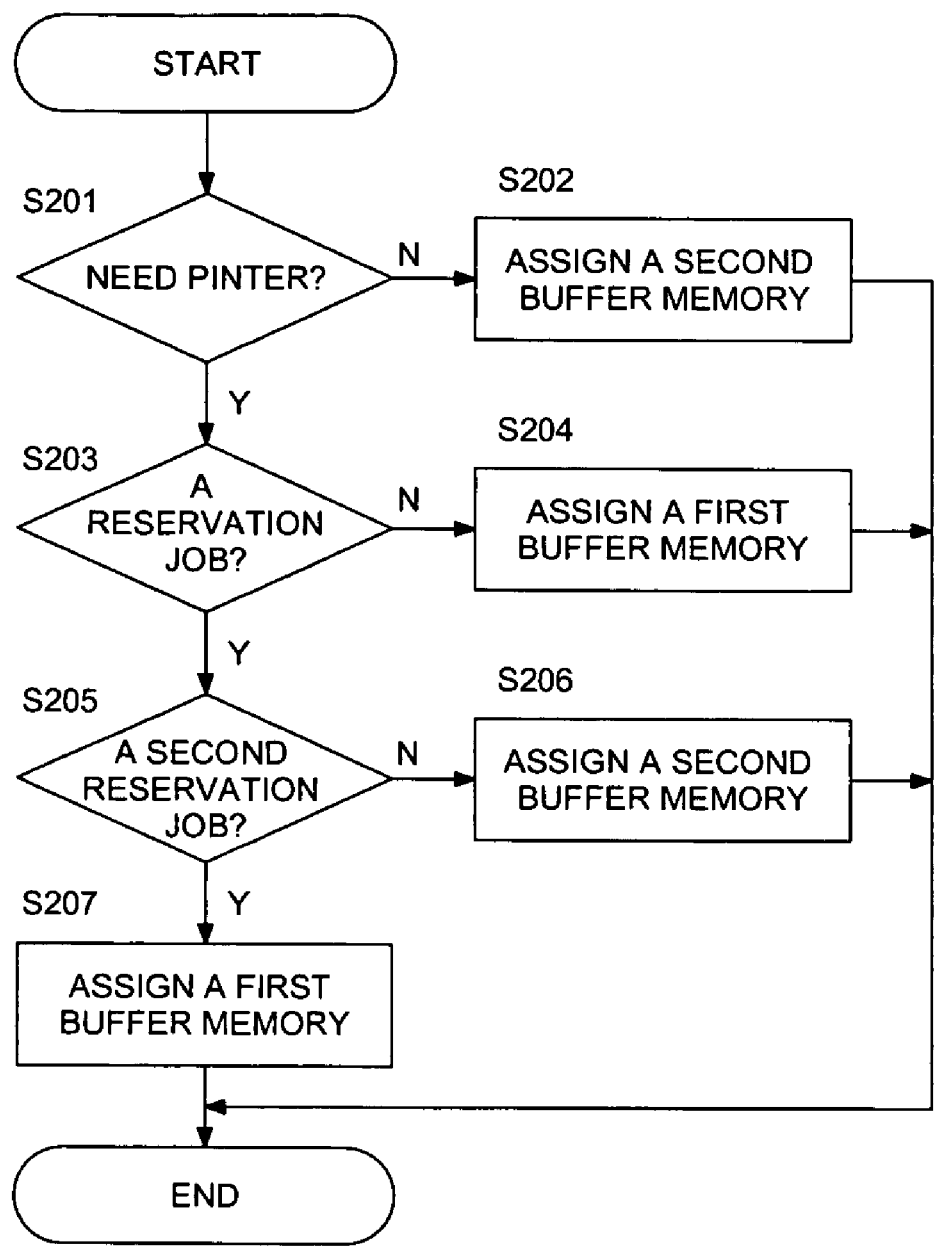
FIG. 6 is a flow chart showing how to select a first image processing section or a second image processing section to process a raster of image data when the image data is input.

FIG. 6 is a flow chart, which explains, the process of inputting image data for the next raster of an image, how to select first image data processing section 20 or second image processing section 30 to process the image data of the raster. In this process, when inputting the image data for a new raster, a buffer memory device is assigned to process the image data among plural buffer memory devices.

Firstly, Step S201 determines if a job requires printer section 12 or not. If the job does not require printer section 12 (step 201; N), then second image processing section 30 is assigned. In the previous examples, an IP scan job or thumbnail display sequence corresponds to this flow.

In the case when printer section 12 is necessary (step 201; Y), determine if the job related to the input processing is a reservation job (step S203) and if it is a current job, not a reservation job (step S203), then first image processing section 20 is assigned to the job (step S204). In the case that the job is a reservation job (step S203; Y), then judge if this job is the second reservation job or not (step S205). In the case that the job is not the second reservation job (step S205; N), then second image processing section 30 is assigned to the job (step S206) and if it is the second reservation job (step S205; Y), then image processing section 20 is assigned to the job (step S207).

It thereby become possible to execute plural jobs at a high rate by using first image processing section 20 and second image processing section 30 efficiently and selecting and assigning a buffer memory device according to the procedures explained above when inputting a new raster of image data.

Although one preferred embodiment of an image processing apparatus in accordance with this invention has just been described in detail, those skilled in the art will recognize that various substitutions and modifications can be made to the apparatus without departing from the scope and spirit of the invention as cited in the appended claims. For example, in this embodiment, the highest priority as an output device is given to printer section 12, however another embodiment may be the output device, which has the highest priority. In this case, the output device having the highest priority, may be treated the same as printer section 12, and the image data is controlled in first image processing section 20 or second image processing section 30 as explained in the embodiments above.

In this embodiment, the highest priority is placed on printer section 12 as an output device to enable printer section 12 to operate more efficiently. Namely, a short execution delay in the operation of hard disk unit 47 barely inconveniences the users, however in regard to printer section 12, there is the possibility that the users might be waiting for output from the printer. By placing the highest priority on printer section 12, the process, which might cause users wait, is executed at high rate, which improves performances for users.

Further, in this embodiment, the two sets of image processing sections, first image processing section 20 and second image processing section 30, which comprise a buffer memory device, a memory device control section and a compression extension section, are shown. However, processing capability of the image processing section, capacity of the memory section may be same or different and there may be three sets of image processing sections.

In the embodiment explained above, printer section 12 is permanently dedicated to first image processing section 20, however it is possible to configure a circuit so that printer section 12 can be selectively connected to either first image processing section 20 or second image processing section 30. In this case, a selection of buffer memory device may be controlled so that the buffer memory device, which is used with a current print job, is used as a buffer memory device for input processing for the job, which relates to the same job. In the case that a job requires both a input processing and output processing, the input processing is conducted first after which the output processing is started after at least one raster of image data has been input. Consequently, processing efficiency can be improved by assigning a buffer memory device so that the buffer memory device, which is used for the output processing, and the buffer memory device, which is used for the input processing, become the same buffer memory device, so that no data transfer between two different buffer memory devices becomes necessary.

Image data saving from first buffer memory device 21 and/or second buffer memory device 31 to hard disk unit 47 makes it not only possible to process a large size of image data at less expensive but also contributes to increase processing rate. Namely, when image data stored in the buffer memory device cannot be processed immediately, make the buffer memory device released after which input processing execution will be available by saving image data from the buffer memory device to hard disk unit 47.

Further, even though second buffer memory device 30 is used for image data in input processing, once the image data is stored in hard disk unit 47, it is possible to supply the image data from hard disk unit 47 to first buffer memory device 21 directly. By this act, it becomes possible to avid lowering performance due to a concentrated access to first buffer memory device, when outputting to printer section 12, since it is not necessary to transmit image data from second buffer memory device 31 to first buffer memory device 21, while transmitting image data from first buffer memory device 21 to printer section 12. It is also possible to process to execute the next job by using second buffer memory device 31 since second buffer memory device 31 has been emptied.

When copying a large number of paper sheets and printing a large number of paper sheets, without using hard disk unit 47, while storing and keeping image data from scanner 11 in a buffer memory device, the buffer memory device has been occupied by the image data for several hours depending on the number of paper sheets. And in case the next job requires printer section 12, another buffer memory device fills immediately whereby it becomes impossible to process a reservation job and/or second reservation job.

On the other hand, once image data can be saved to hard disk unit 47, it becomes possible to simultaneously execute the reservation job and second reservation job together with the current job. As explained above, it is play important roles to save image data to hard disk unit 47 for executing plural jobs efficiently and simultaneously.

What is claimed is:

1. An image processing apparatus being capable of simultaneously processing plural jobs for image data processing, the image processing apparatus comprising:
   one or more input devices to input image data;
   a first buffer memory to temporarily store image data being input from the one or more input devices or image data to be output;
   a second buffer memory to temporarily store image data being input from the one or more input devices or image data to be output, wherein the first and second buffer memories are connected to a bus and are independent of each other and capable of being simultaneously accessible;
   a plurality of output devices which are connected to the first buffer memory device and the second buffer memory device through the bus;
   a printer section permanently dedicated to the first buffer memory without going through the bus, the printer section forms an image based on the image data;
   a control section which controls transfer of image data so that when simultaneously executing a job which uses the printer section and a job which uses one of the plurality of output devices without using the printer section in parallel, image data is stored in the first buffer memory for the job which uses the printer section and the image data is transferred from the first buffer memory to the printer section, and image data is stored in the second buffer memory for the job which uses one of the plurality of output devices without using the printer section and the image data is transferred from the second buffer memory to the one of the plurality of output devices via the bus.

2. The image processing apparatus of claim 1, wherein the control section, when starting a second job which includes an inputting process from the input device and an outputting process to the printer section while executing a first job that uses the printer section, starts the inputting process of image data for the second job using the second buffer memory, and when the first job completes before the inputting process completes, changes the buffer memory using for the inputting process to the first buffer memory.

3. The image processing apparatus of claim 2, wherein the control section changes the buffer memory using for the inputting process to the first buffer memory by page.

* * * * *